US011133029B2

(12) United States Patent
Liang et al.

(10) Patent No.: US 11,133,029 B2
(45) Date of Patent: Sep. 28, 2021

(54) TAPE HEAD WITH ELEMENT-TO-ELEMENT SPACING AND ADJUSTMENT AND MECHANISM TO CONTROL THE SPACING

(71) Applicant: International Business Machines Corporation, Armonk, NY (US)

(72) Inventors: Jason Liang, Campbell, CA (US); Robert G. Biskeborn, Hollister, CA (US); Robert E. Fontana, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/226,287

(22) Filed: Dec. 19, 2018

(65) Prior Publication Data
US 2020/0202892 A1    Jun. 25, 2020

(51) Int. Cl.
*G11B 5/588* (2006.01)
*G11B 5/58* (2006.01)
(Continued)

(52) U.S. Cl.
CPC .......... *G11B 5/588* (2013.01); *G11B 5/00882* (2013.01); *G11B 5/3163* (2013.01);
(Continued)

(58) Field of Classification Search
CPC ..... G11B 5/588; G11B 15/62; G11B 5/00882; G11B 5/581; G11B 2005/001; G11B 5/3163; G11B 5/3116
See application file for complete search history.

(56) References Cited

U.S. PATENT DOCUMENTS

| 4,241,367 A | * | 12/1980 | Nomura | ................ G11B 5/31 360/123.25 |
| 4,897,747 A | * | 1/1990 | Meunier | ............. G11B 5/235 360/122 |

(Continued)

FOREIGN PATENT DOCUMENTS

EP          0883120 A1    12/1998

OTHER PUBLICATIONS

"The Three Most Popular Shielding Metals and What You Should Know About Them"; https://leadertechinc.com/blog/the-three-most-popular-shielding-metals-and-what-you-should-know-about-them/; Author:"LeaderTech Inc."; Mar. 11, 2016; pp. 1-6.*

(Continued)

*Primary Examiner* — Brian E Miller
(74) *Attorney, Agent, or Firm* — Zilka-Kotab, P.C.

(57) ABSTRACT

An apparatus, according to one embodiment, includes a substrate and a closure above the substrate. A gap is positioned between the closure and the substrate, the gap having an array of magnetic transducers extending therealong and unpatterned films. The gap further includes a first layer of a first material having a bulk modulus of elasticity lower than the unpatterned films in the gap. An apparatus according to another embodiment includes a plurality of magnetic transducers arranged in a linear array, and a layer of an expansion material between each adjacent pair of magnetic transducers in the array. An encapsulant is positioned between each layer of the expansion material and the adjacent magnetic transducers. The expansion material has a greater coefficient of thermal expansion than the encapsulant.

18 Claims, 12 Drawing Sheets

(51) Int. Cl.
  *G11B 15/62* (2006.01)
  *G11B 5/008* (2006.01)
  *G11B 5/31* (2006.01)
  *G11B 5/00* (2006.01)

(52) U.S. Cl.
  CPC .............. *G11B 5/581* (2013.01); *G11B 15/62* (2013.01); *G11B 5/3116* (2013.01); *G11B 2005/001* (2013.01)

(56) References Cited

U.S. PATENT DOCUMENTS

| | | | | |
|---|---|---|---|---|
| 4,967,299 A * | 10/1990 | Katoh | ............... | G11B 5/3103 360/121 |
| 5,187,621 A * | 2/1993 | Tacklind | ............... | G11B 23/505 174/384 |
| 5,269,895 A * | 12/1993 | Michalek | ............... | G11B 5/3103 204/192.22 |
| 5,751,514 A * | 5/1998 | Hyde | ............... | G11B 5/4853 360/97.21 |
| 5,858,548 A * | 1/1999 | Kirino | ............... | G11B 5/31 428/457 |
| 5,940,956 A * | 8/1999 | Jordan | ............... | G11B 5/3173 29/603.16 |
| 6,519,123 B1 * | 2/2003 | Sugawara | ............... | B82Y 10/00 257/E43.004 |
| 6,757,128 B2 | 6/2004 | Yip | | |
| 7,027,250 B2 | 4/2006 | Lau | | |
| 7,586,710 B2 | 9/2009 | Partee et al. | | |
| 8,081,398 B2 | 12/2011 | Hachisuka | | |
| 8,724,247 B2 | 5/2014 | Poorman et al. | | |
| 10,699,741 B1 | 6/2020 | Biskeborn | ............... | G11B 15/1841 |
| 2002/0034042 A1 * | 3/2002 | Hungerford | ......... | G11B 5/3163 360/119.05 |
| 2005/0254170 A1 * | 11/2005 | Dugas | ............... | G11B 5/3173 360/119.11 |
| 2006/0039082 A1 * | 2/2006 | Biskeborn | ............ | G11B 5/4893 360/129 |
| 2006/0050432 A1 * | 3/2006 | Lee | ............... | G11B 5/3103 360/123.01 |
| 2006/0077593 A1 * | 4/2006 | Ueda | ............... | G11B 5/6082 360/235.1 |
| 2006/0114615 A1 * | 6/2006 | Pinarbasi | ............... | G11B 5/127 360/322 |
| 2007/0030594 A1 * | 2/2007 | Biskeborn | ............... | G11B 5/10 360/129 |
| 2007/0165336 A1 * | 7/2007 | Kamai | ............... | G11B 5/3929 360/324.1 |
| 2007/0165338 A1 * | 7/2007 | Kamai | ............... | G11B 5/3906 360/324.2 |
| 2008/0253022 A1 * | 10/2008 | Biskeborn | ............... | G11B 5/17 360/122 |
| 2009/0237833 A1 * | 9/2009 | Sato | ............... | G11B 5/00813 360/77.12 |
| 2009/0262456 A1 * | 10/2009 | Dugas | ............... | G11B 5/3183 360/110 |
| 2010/0053817 A1 * | 3/2010 | Biskeborn | ............ | G11B 5/3909 360/313 |
| 2010/0172054 A1 * | 7/2010 | Yamaguchi | .......... | G11B 5/1278 360/125.03 |
| 2012/0307397 A1 * | 12/2012 | Biskeborn | ............ | G11B 5/3106 360/75 |
| 2012/0307399 A1 * | 12/2012 | Hoerger | ............. | G11B 5/00878 360/75 |
| 2014/0063646 A1 * | 3/2014 | Biskeborn | ............ | G11B 5/3967 360/75 |
| 2015/0340064 A1 * | 11/2015 | Biskeborn | ................ | G11B 5/60 369/53.44 |
| 2016/0372142 A1 * | 12/2016 | Biskeborn | ............ | G11B 5/3106 |
| 2017/0330588 A1 * | 11/2017 | Biskeborn | .......... | G11B 5/00813 |
| 2020/0273487 A1 * | 8/2020 | Biskeborn | ............ | G11B 5/3909 |

OTHER PUBLICATIONS

Biskeborn et al., "Tape Head Technology," Information Storage Industry Consortium, International Magnetic Tape Storage Roadmap, May 2012, pp. 107-128.

Patent Board Decision on Appeal from U.S. Appl. No. 11/559,991, dated Apr. 10, 2012.

* cited by examiner

TAPE HEAD WITH ELEMENT-TO-ELEMENT SPACING AND ADJUSTMENT AND MECHANISM TO CONTROL THE SPACING

BACKGROUND

The present invention relates to data storage systems, and more particularly, this invention relates to element-to-element spacing adjustment in a magnetic tape head.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read transducers in near contact with the tape to provide effective coupling of the magnetic field from the tape to the read transducers.

The quantity of data stored on a magnetic tape may be expanded by increasing the number of data tracks across the tape. More tracks are made possible by reducing feature sizes of the readers and writers, such as by using thin-film fabrication techniques and magnetoresistive (MR) sensors. However, for various reasons, the feature sizes of readers and writers cannot be arbitrarily reduced, and so factors such as tape skew, lateral tape motion (e.g., perpendicular to the direction of tape travel), transients and tape lateral expansion and contraction must be balanced with reader/writer sizes that provide acceptable written tracks and readback signals.

SUMMARY

An apparatus, according to one embodiment, includes a substrate and a closure above the substrate. A gap is positioned between the closure and the substrate, the gap having an array of magnetic transducers extending therealong and unpatterned films. The gap further includes a first layer of a first material having a bulk modulus of elasticity lower than the unpatterned films in the gap.

An apparatus according to another embodiment includes a plurality of magnetic transducers arranged in a linear array, and a layer of an expansion material between each adjacent pair of magnetic transducers in the array. An encapsulant is positioned between each layer of the expansion material and the adjacent magnetic transducers. The expansion material has a greater coefficient of thermal expansion than the encapsulant.

An apparatus according to yet another embodiment includes a plurality of magnetic transducers arranged in a linear array. A layer of an expansion material is positioned between each adjacent pair of magnetic transducers in the array, each layer of expansion material including a piezoelectric layer configured to adjust a pitch between the magnetic transducers adjacent thereto.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, an apparatus includes a substrate and a closure above the substrate. A gap is positioned between the closure and the substrate, the gap having an array of magnetic transducers extending therealong and unpatterned films. The gap further includes a first layer of a first material having a bulk modulus of elasticity lower than the unpatterned films in the gap.

In another general embodiment, an apparatus includes a plurality of magnetic transducers arranged in a linear array, and a layer of an expansion material between each adjacent pair of magnetic transducers in the array. An encapsulant is positioned between each layer of the expansion material and the adjacent magnetic transducers. The expansion material has a greater coefficient of thermal expansion than the encapsulant.

In yet another general embodiment, an apparatus includes a plurality of magnetic transducers arranged in a linear array. A layer of an expansion material is positioned between each adjacent pair of magnetic transducers in the array, each layer of expansion material including a piezoelectric layer configured to adjust a pitch between the magnetic transducers adjacent thereto.

Figure 1A:
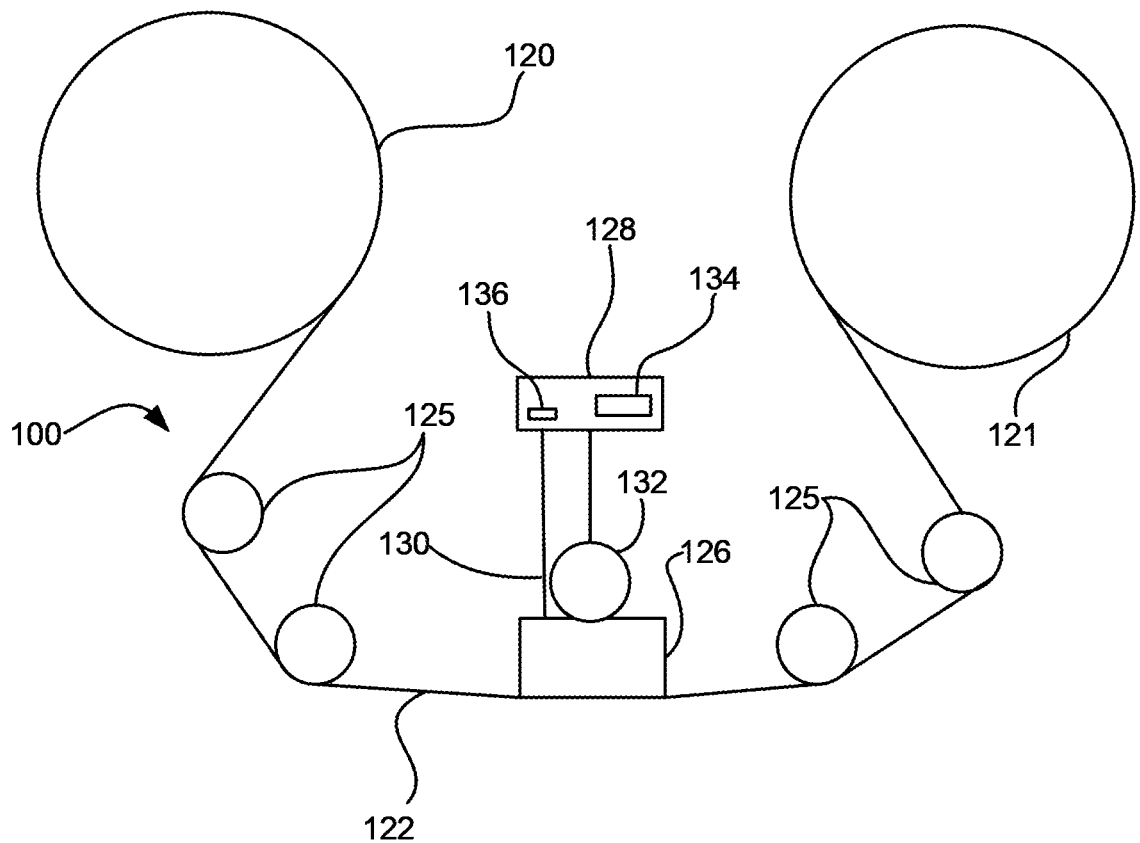
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
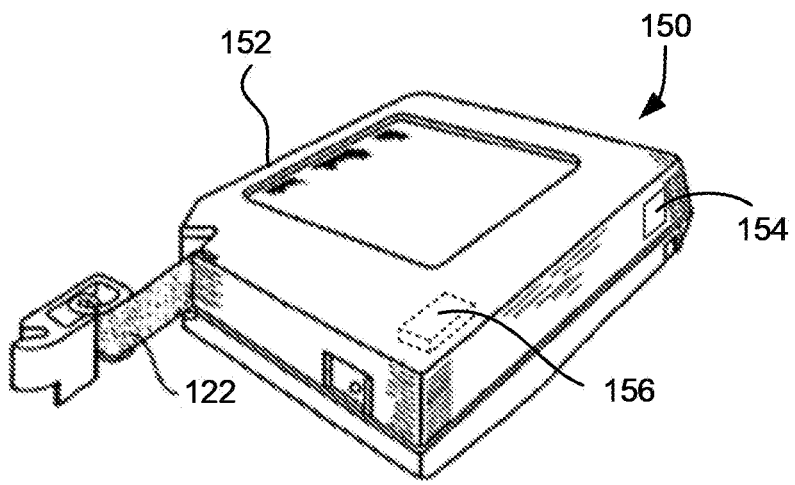
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or another device.

Figure 2A:
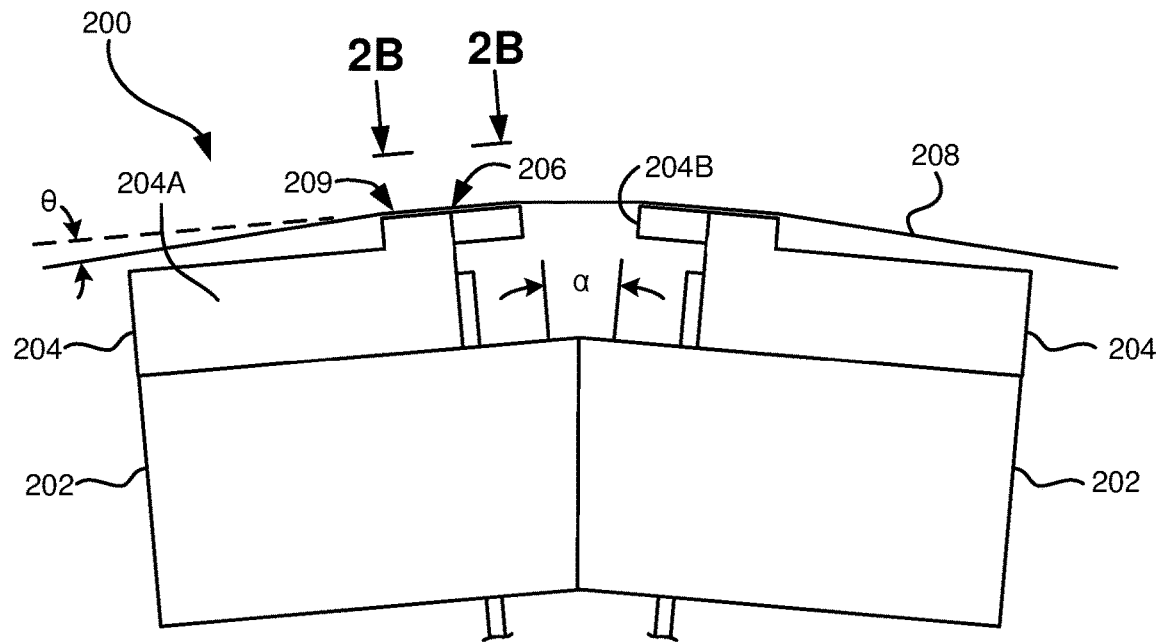
FIG. 2A illustrates a side view of a flat-lapped, bi-directional, two-module magnetic tape head according to one embodiment.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2B:
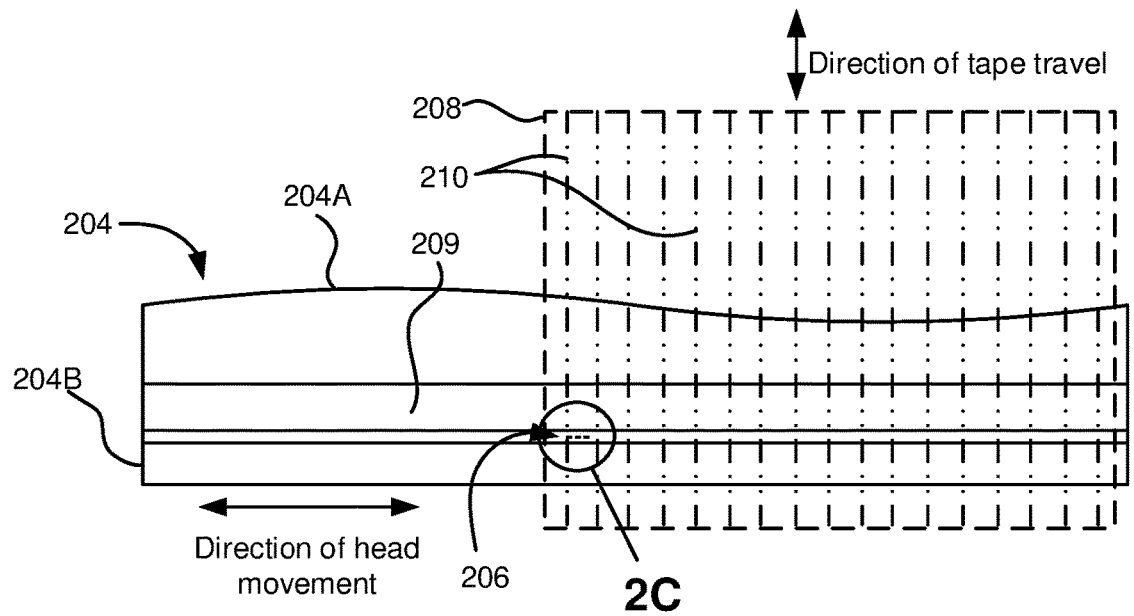
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2C:
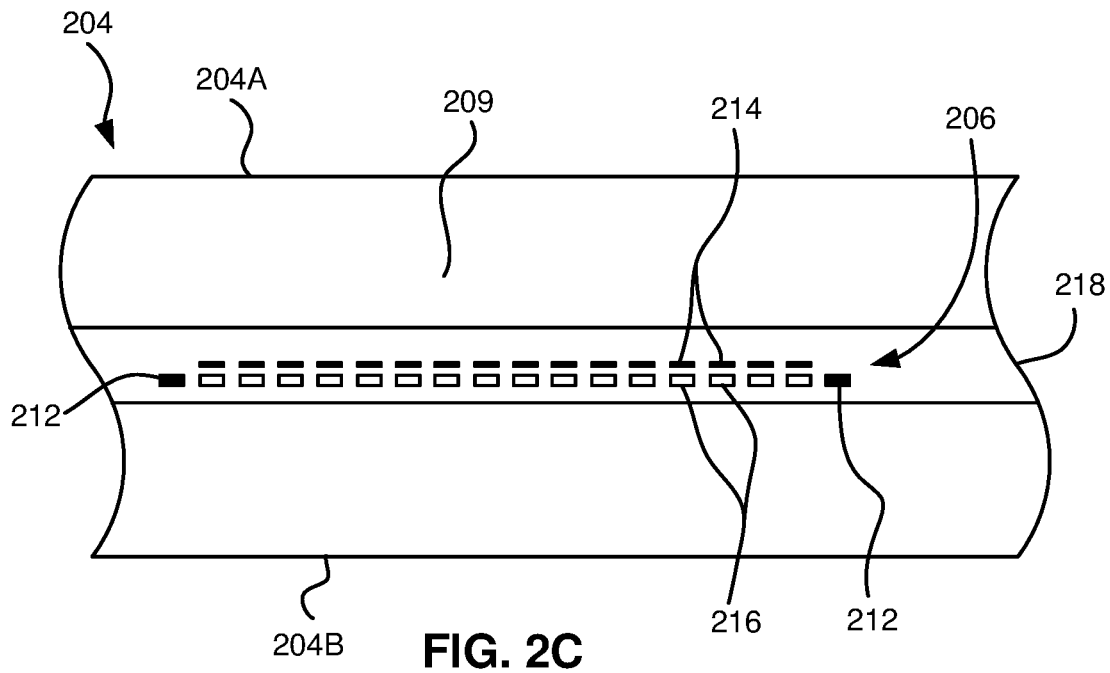
FIG. 2C is a detailed view taken from Circle 2C of FIG. 2B.

FIG. 2C depicts a plurality of readers and/or writers 206 formed in a gap 218 on the module 204 in Circle 2C of FIG. 2B. As shown, the array of readers and writers 206 includes, for example, 16 writers 214, 16 readers 216 and two servo readers 212, though the number of transducers may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducers could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2C, the readers 216 and writers 214 may also be arranged in an interleaved configuration. Alternatively, each array of readers and/or writers 206 may be readers or writers only, and the arrays may contain one or more servo readers 212. As noted by considering FIGS. 2A and 2B-2C together, each module 204 may include a complementary set of readers and/or writers 206 for such things as bi-directional reading and writing, read-while-write capability, backward compatibility, etc.

Figure 2D:
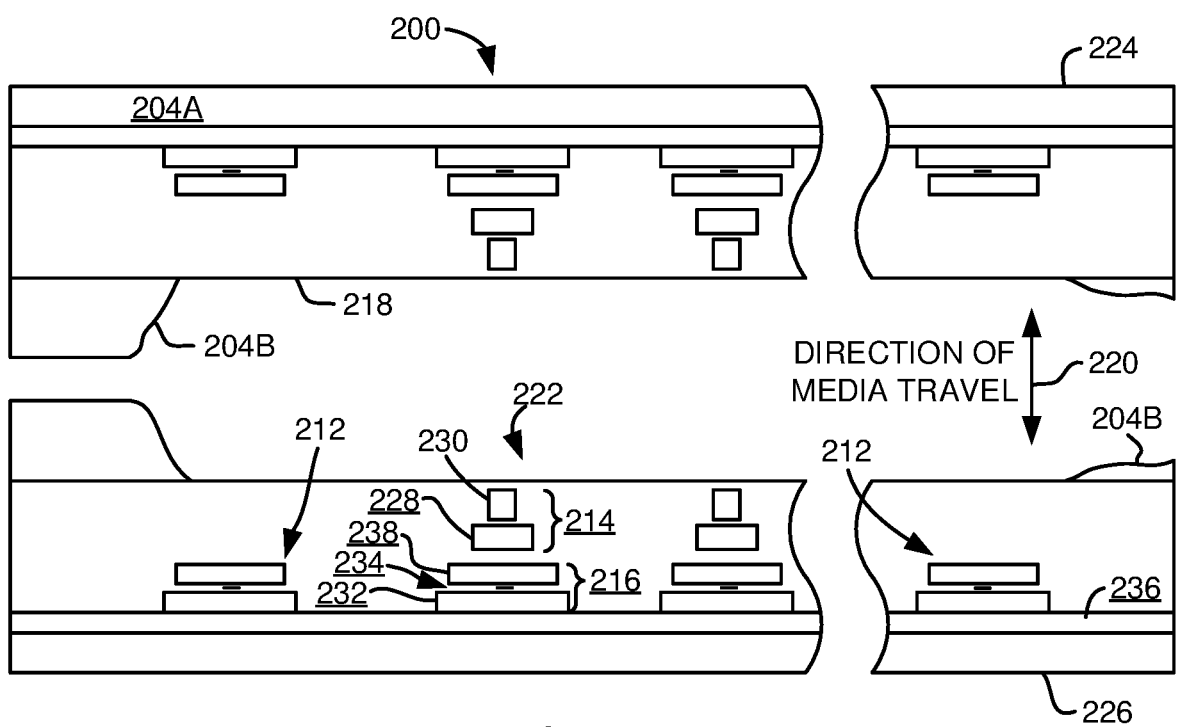
FIG. 2D is a detailed view of a partial tape bearing surface of a pair of modules.

FIG. 2D shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked magnetoresistive (MR) head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (−), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
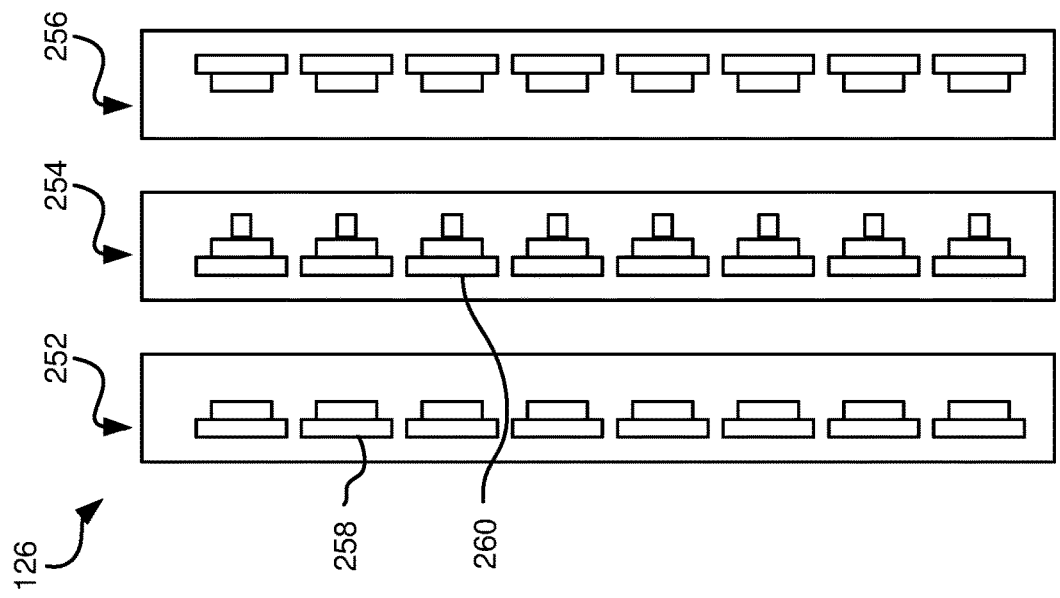
FIG. 4 is a partial tape bearing surface view of a magnetic head having a read-write-read configuration.
Figure 3:
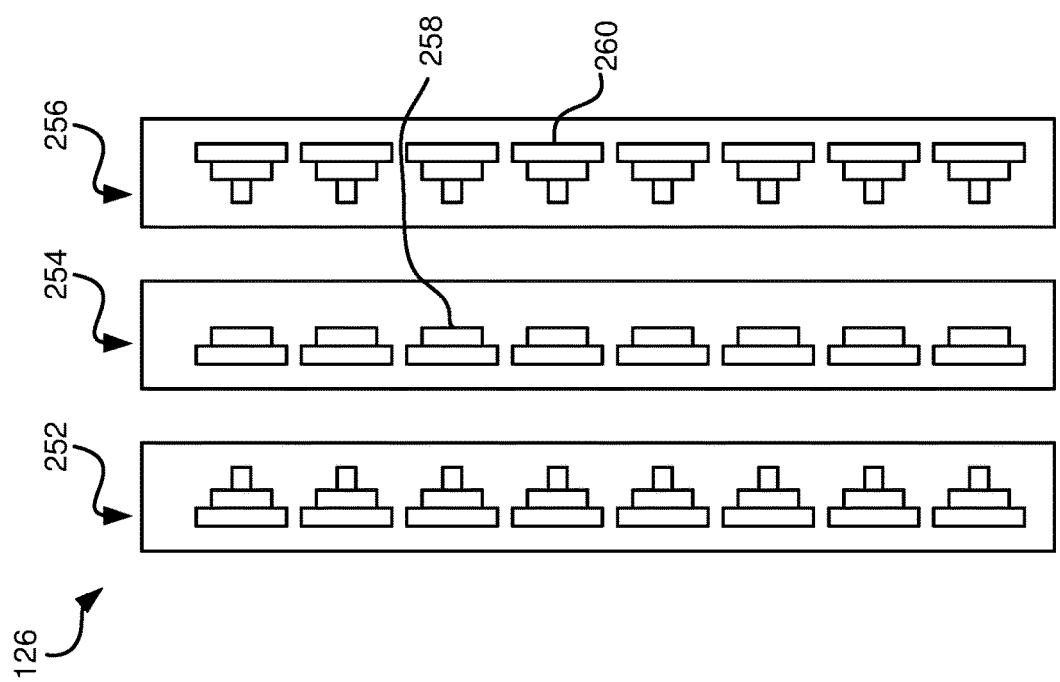
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
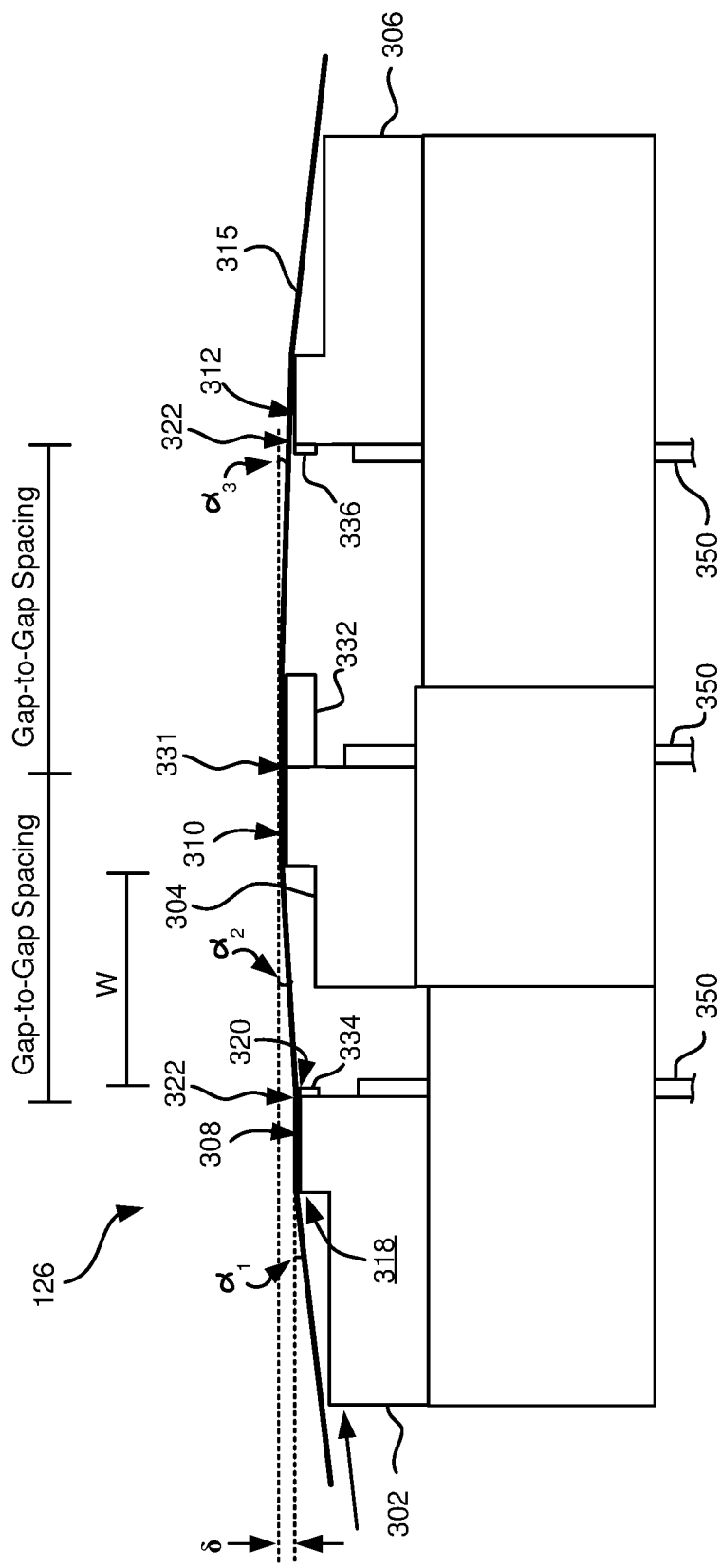
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
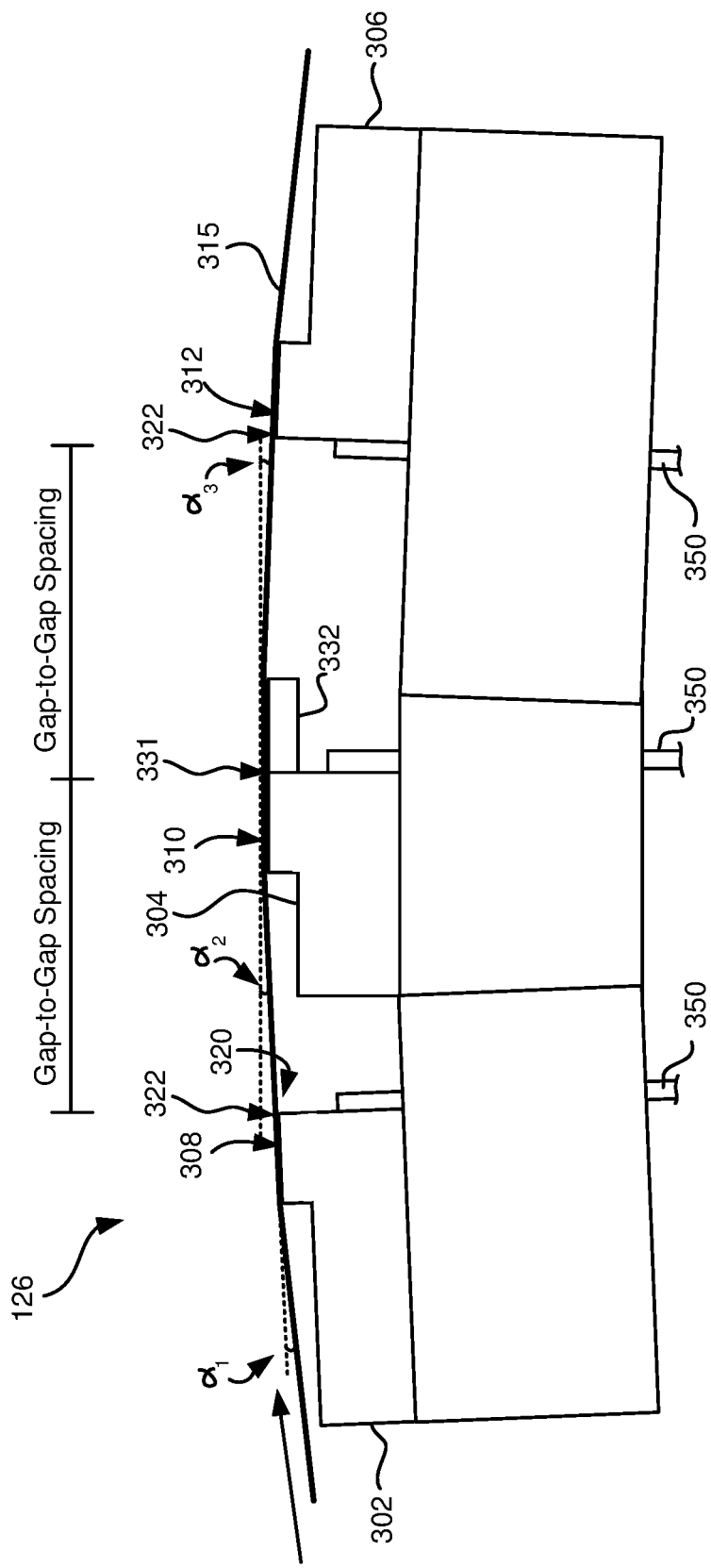
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write transducers 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the transducers on the leading module 302. Further, at the trailing module 306, the tape 315 flies over the tape bearing surface 312 so there is virtually no wear on the transducers when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write transducers away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the transducers during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the transducers in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
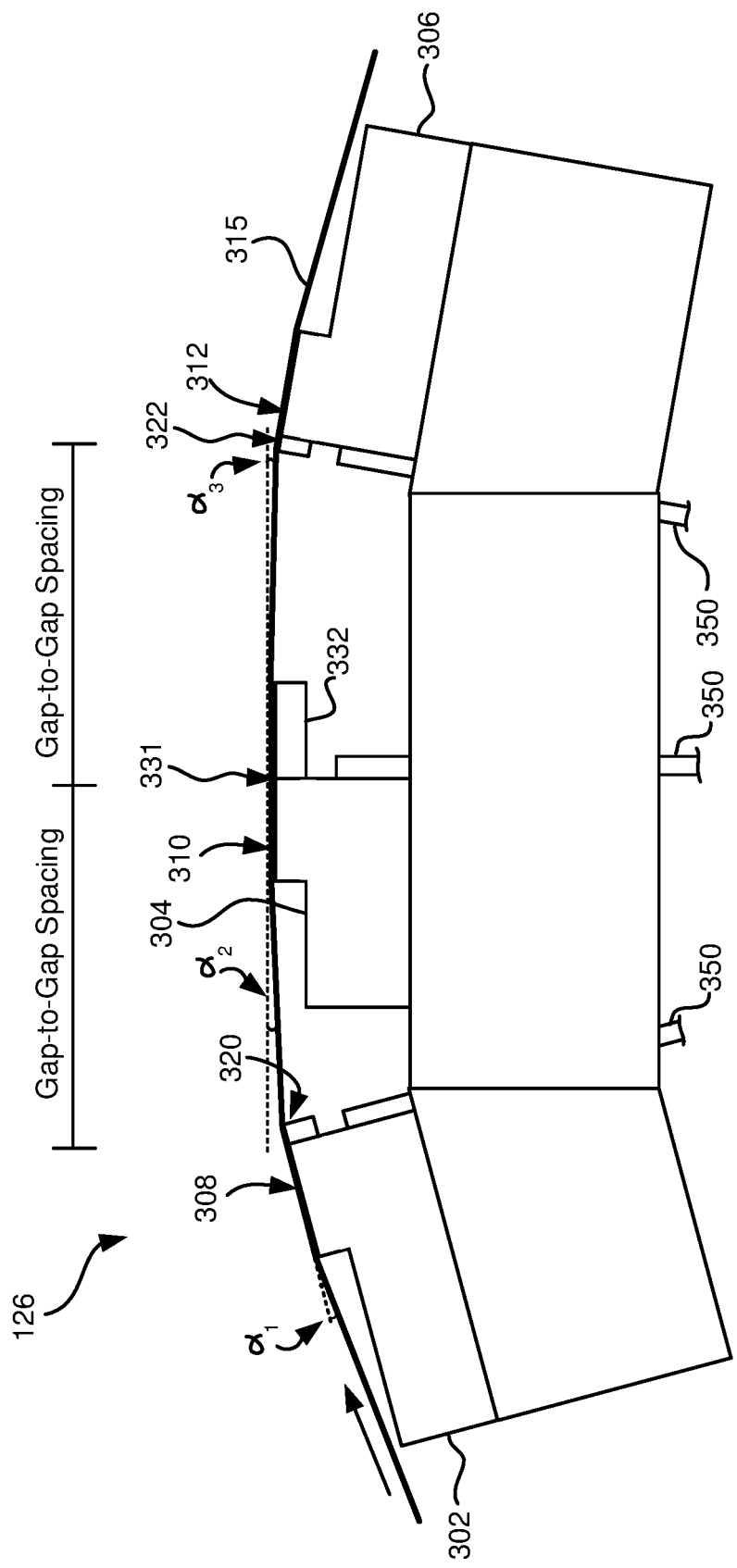
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
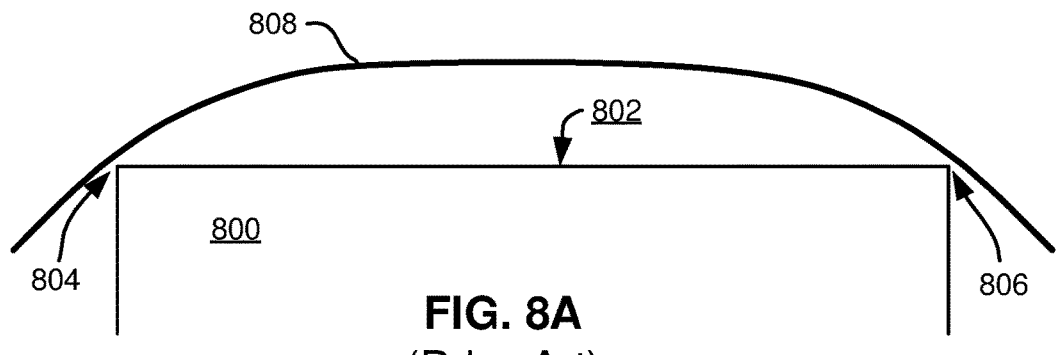
FIGS. 8A-8C are schematics depicting the principles of tape tenting.
Figure 8B:
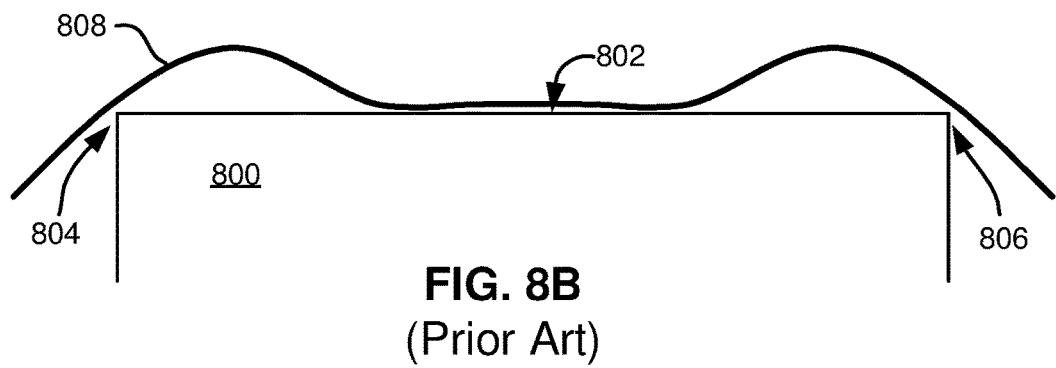
Figure 8C:
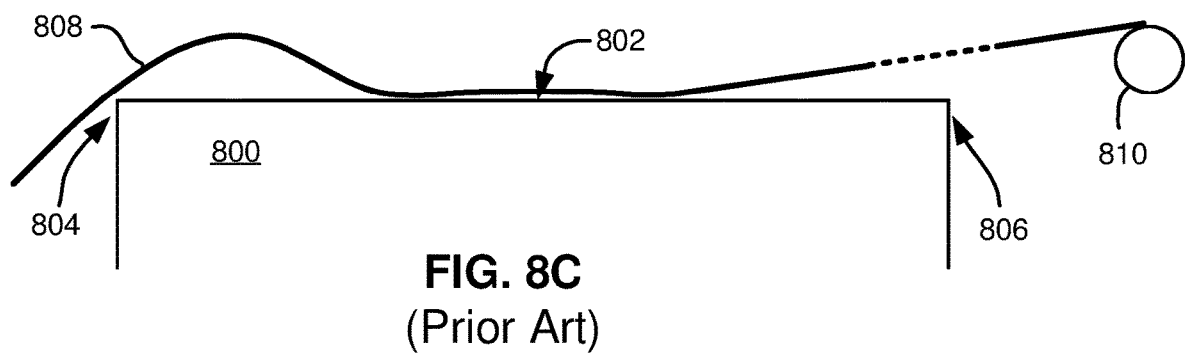

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various embodiments herein can be implemented with a wide range of file system formats, including for example IBM Spectrum Archive Library Edition (LTFS LE). However, to provide a context, and solely to assist the reader, some of the embodiments below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
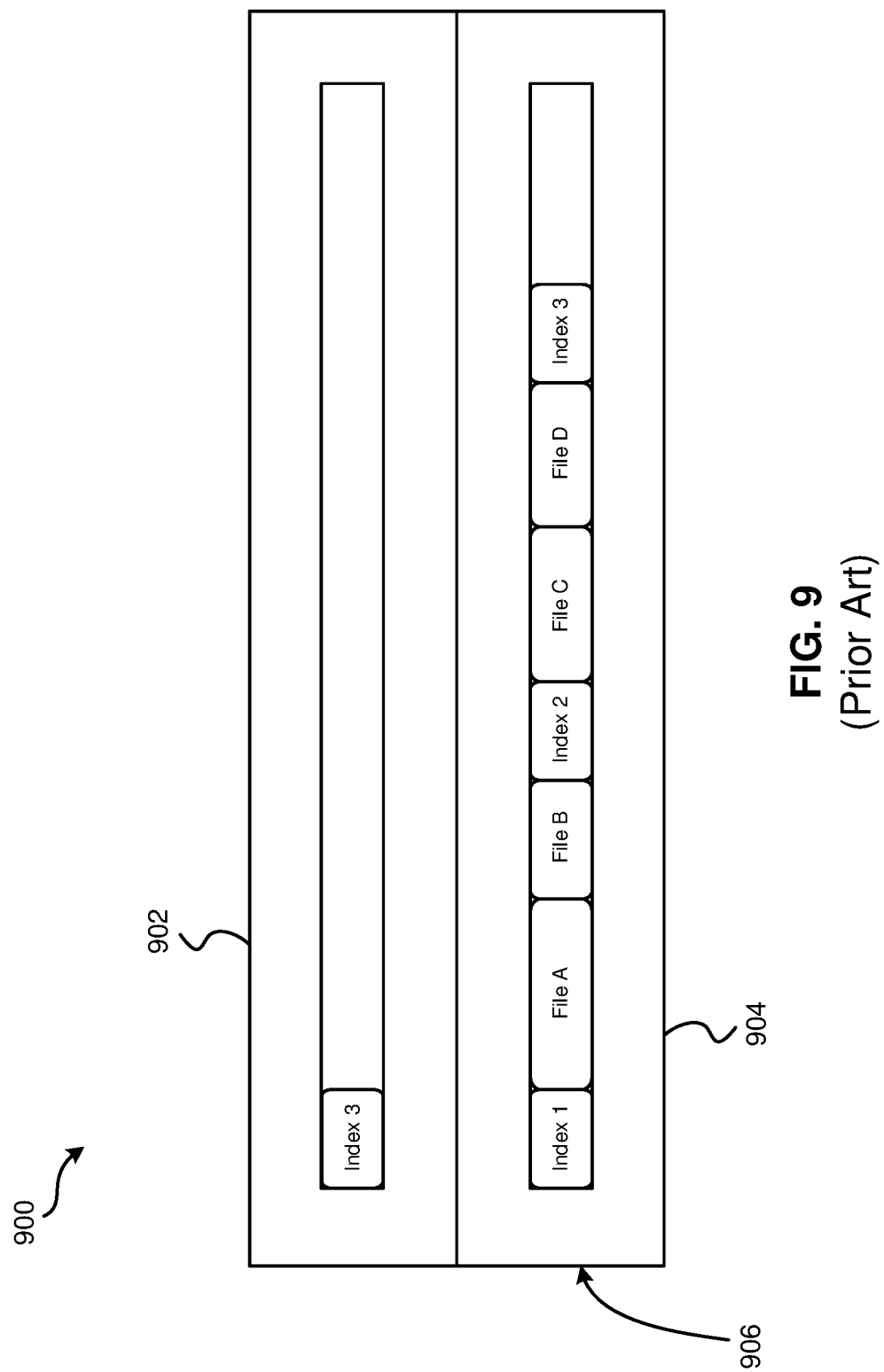
FIG. 9 is a representational diagram of files and indexes stored on a magnetic tape according to one embodiment.

Looking to FIG. 9, a magnetic tape 900 having an index partition 902 and a data partition 904 is illustrated according to one embodiment. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired embodiment. According to some embodiments, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

Tape Dimensional Instability (TDI) refers to the lateral expansion and contraction of the tape due to numerous factors, including storage duration, packing tension, temperature and humidity, etc. As tracks on tape become smaller, and as tapes become thinner, head misregistration due to TDI becomes a significant problem, particularly for the outermost transducers in an array. For example, tracks written at one time may no longer align with the outer groups of readers on the magnetic tape head, resulting in an inability to retrieve data.

The writing process may also be compromised because the lateral expansion or contraction of the tape may cause TDI-induced misregistration, which may result in excessive trimming of previously written tracks. In some cases, the lateral expansion or contraction of the tape may be to such an extent that the set distance between transducers in the array no longer allows all transducers to be aligned with the correct tracks of the tape.

Numerous ideas have been considered to address this issue. For example, contemplated approaches include preheating the tape, changing tension to alter the width of the tape, rewinding at very low tension, etc. However, each of these contemplated approaches may have drawbacks, and moreover, rely on manipulating the tape itself. Also, if expansion of the tape has not been satisfactorily compensated by these suggested approaches, data may not be retrieved or may be overwritten. A solution remains elusive for a magnetic head that can fully compensate for the expansion and contraction of the tape for current generations and future generations of tape storage products. Moreover, a solution is essential for error recovery.

Figures 10A, 10B:
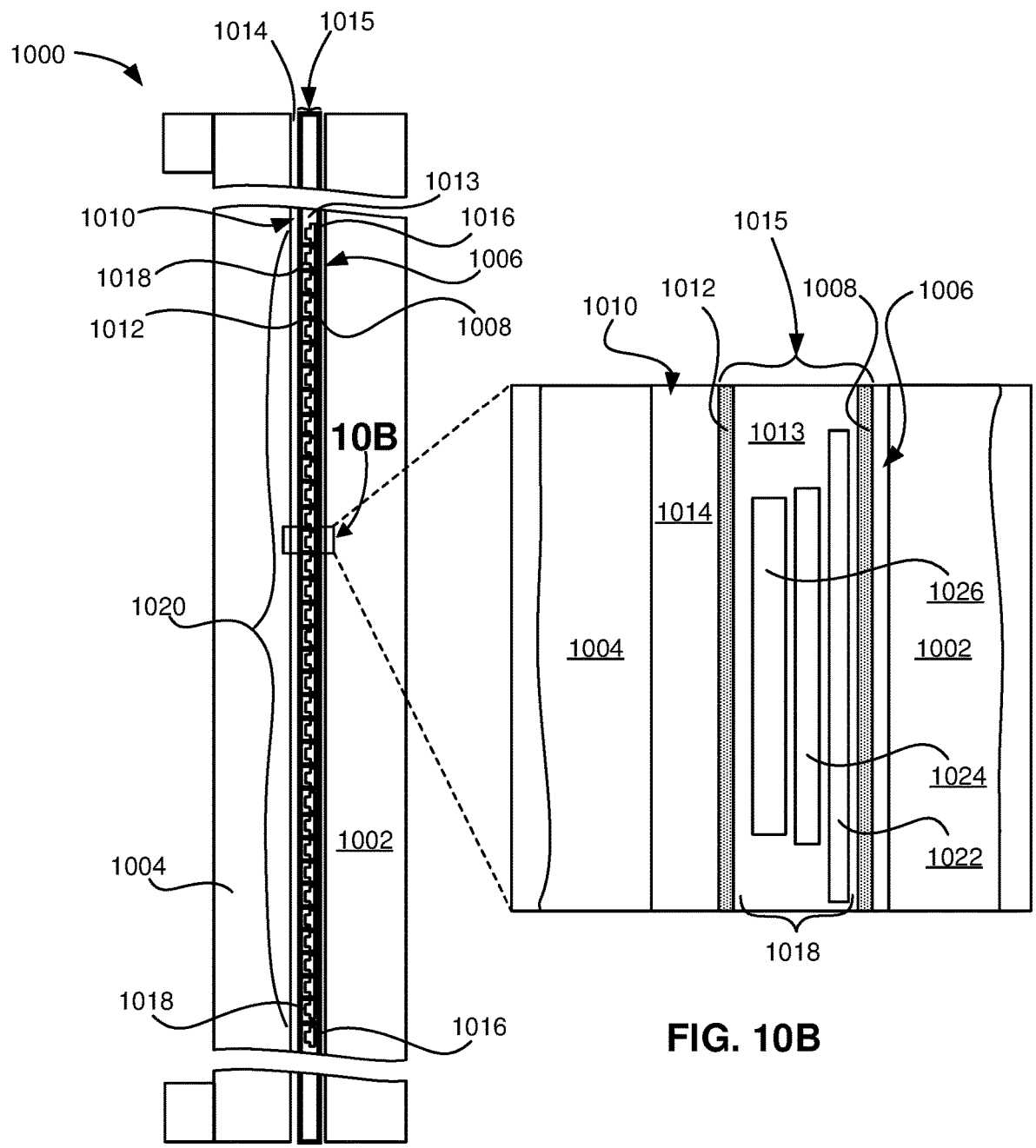
FIG. 10A is a schematic drawing of a partial tape bearing surface view of a module, according to one embodiment.
FIG. 10B is magnified view of box 10B of FIG. 10A.

FIGS. 10A and 10B depict an apparatus 1000, in accordance with one embodiment. As an option, the present apparatus 1000 may be implemented in conjunction with features from any other embodiment listed herein, such as those described with reference to the other FIGS. Of course, however, such an apparatus 1000 and others presented herein may be used in various applications and/or in permutations which may or may not be specifically described in the illustrative embodiments listed herein. Further, the apparatus 1000 presented herein may be used in any desired environment.

According to one embodiment, the undercoat and/or overcoat in a gap positioned between the closure and substrate includes a layer or layers of low-modulus material that may allow the array of transducers in the head to expand and contract more easily. In conventional heads, the transducers are sandwiched between two hard ceramic pieces (e.g. aluminum-titanium-carbide (AlTiC)) in relatively rigid insulating layers. The ceramic material controls the lateral motion of the transducers which are mechanically coupled thereto. The layer(s) of low-modulus material, as described herein, relieve the strength of the coupling between the transducers and the hard ceramics and allow for more head expansion and contraction with less increase in stress.

The low-modulus material has a bulk modulus of elasticity lower than the other unpatterned films in the gap. Where two layers of low-modulus material are present, the low-modulus materials of the layers may be the same or different.

According to one embodiment as shown in FIG. 10A, an apparatus 1000 includes a substrate 1002, and an undercoat layer 1006 above the substrate 1002, where the undercoat layer 1006 includes at least one layer of a first material 1008 (single or a combination of materials) having a bulk modulus of elasticity lower than a bulk modulus of elasticity of the substrate 1002. The apparatus 1000 further includes a gap 1015 extending along the substrate 1002 above the undercoat layer 1006, the gap 1015 having an array 1020 of magnetic transducers 1018 extending therealong and unpatterned films 1013 of known type, such as planarization layers, encapsulation layers, etc. The array 1020 of magnetic transducers 1018 includes servo readers 1016 positioned proximate to the array 1020 of magnetic transducers 1018. In addition, the apparatus 1000 includes an overcoat layer 1010 above the array 1020 of magnetic transducers 1018 and a closure 1004 above the overcoat layer 1010, where the overcoat layer 1010 includes at least one layer of a second material 1012 having a bulk modulus of elasticity lower than the bulk modulus of elasticity of the unpatterned films 1013 in the gap 1015.

In various approaches described herein, a layer of material may be included in the undercoat above the substrate and/or overcoat below the closure, respectively, such that the material has a low modulus of elasticity thereby causing the array of transducers to be more weakly coupled both to the substrate and closure and enable shearing to occur between the array of transducers and the substrate and closure with less stress in the films.

In some approaches, a layer of a first material 1008 having a bulk modulus of elasticity less than the bulk modulus of elasticity of the unpatterned films may reduce mechanical coupling between the array 1020 of magnetic transducers 1018 and the substrate 1002. Likewise, a layer of a second material 1012 having a bulk modulus of elasticity less than the bulk modulus of elasticity of the unpatterned films may reduce mechanical coupling between the array 1020 of magnetic transducers 1018 and the closure 1004.

In some approaches, the substrate 1002 may be a remaining portion of a wafer used during manufacturing of the magnetic head. In some approaches, the magnetic transducers may be writers. In other approaches, the magnetic transducers may be readers.

FIG. 10B is a magnified view of a magnetic transducer 1018 in the apparatus 1000. As shown, an undercoat layer 1006 above the substrate 1002 may have at least one layer of a first material 1008 having a bulk modulus of elasticity lower than a bulk modulus of elasticity of the unpatterned films 1013. The layer of a first material 1008 may be positioned above the substrate 1002 and below the magnetic transducer 1018. An overcoat layer 1010 positioned above the magnetic transducer 1018 and below the closure 1004 may include at least one layer of a second material 1012 having a bulk modulus of elasticity lower than a bulk modulus of elasticity of the unpatterned films 1013.

In some approaches, the magnetic transducer 1018 may include a first magnetic shield 1022 positioned above the undercoat layer 1006, a second magnetic shield 1024 above the first magnetic shield 1022, and optionally a dummy pole 1026 positioned above the second magnetic shield 1024 and below the overcoat layer 1010.

In some approaches, the overcoat layer 1010 includes a material 1014 where the material 1014 includes at least one layer of the second material 1012. In some approaches, the undercoat layer 1006 includes a material 1014 where the material 1014 includes at least one layer of a first material 1008. In various approaches, the material 1014 may be aluminum.

In some approaches, the first material 1008 may be the same as the second material 1012. In other approaches, the first material 1008 may be different from the second material 1012. The first and second materials may have any desired composition, as long as they meet the bulk modulus criteria. In some approaches, the first material 1008 may be a ductile material. For example, and not meant to be limiting in any way, the first material 1008 and/or second material 1012 may be aluminum or include primarily (>50%) aluminum. In some approaches, the first material 1008 and/or second material 1012 may include a photoresist material.

In some approaches, the thickness of at least one of the layers of the first material 1008 and/or second material 1012 may be in a range of about 0.5 to about 2 microns.

Figure 11:
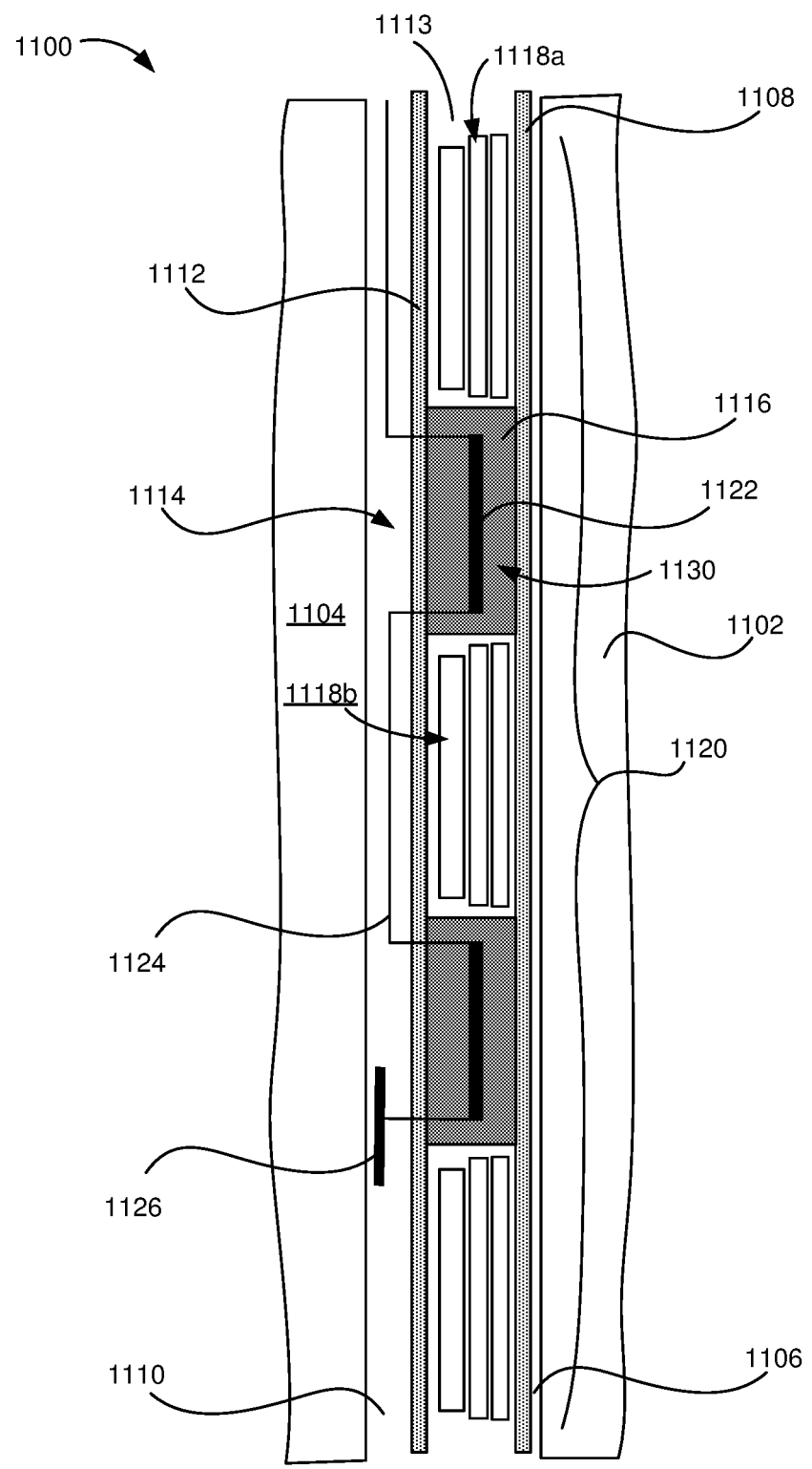
FIG. 11 is a schematic drawing of a partial tape bearing surface view of a module, according to one embodiment.

FIG. 11 depicts an apparatus 1100, in accordance with one embodiment. As an option, the present apparatus 1100 may be implemented in conjunction with features from any other embodiment listed herein, such as those described with reference to the other FIGS. Of course, however, such an apparatus 1100 and others presented herein may be used in various applications and/or in permutations which may or may not be specifically described in the illustrative embodiments listed herein. Further, the apparatus 1100 presented herein may be used in any desired environment.

According to one embodiment, the apparatus 1100 includes a plurality of magnetic transducers 1118a, 1118b arranged in a linear array 1120, a layer of an expansion material 1116 between each adjacent pair of magnetic transducers 1118a, 1118b in the array 1120, and an encapsulant 1114 positioned between each layer of the expansion material 1116 and the adjacent magnetic transducers 1118a, 1118b, where the expansion material 1116 has a greater coefficient of thermal expansion than the encapsulant 1114.

The encapsulant may be any conventional material used in magnetic recording head construction. In some approaches, the encapsulant 1114 may include alumina.

In some approaches, the area 1130 between the magnetic transducers 1118a, 1118b, in which the encapsulant 1114 (e.g. alumina) surrounds the magnetic transducers 1118a, 1118b, may have one or more layers of expansion material 1116 having a greater thermal expansion coefficient than the encapsulant 1114. Exemplary materials of an expansion material 1116 having a greater thermal expansion coefficient than alumina as the encapsulant 1114 include aluminum, permalloy, a memory alloy material, etc. An example of a memory alloy material includes an alloy of nickel and titanium having shape memory and/or super elastic properties which expands in the presence of heat and returns to its original shape when cooled. In some approaches the expansion material 1116 may be capable of shrinking after expanding. In some approaches, the expansion material 1116 may be capable of shrinking before expanding.

In some approaches, the layer of expansion material 1116 between the magnetic transducers 1118a, 1118b may include a piezoelectric material. For example, but not meant to be limiting in any way, exemplary piezoelectric material includes perovskite material, titanate material, etc., and a combination of layers thereof. In these approaches, an applied voltage may be used to alter the expansion of the piezoelectric material.

In various approaches, the additional layers of expansion material between the magnetic transducers may enable changing the pitch between readers or writers based on servo information. For example, the present width of the data band being written to or read is computable using known techniques by the servo processing circuit and/or controller using servo information. Based on the computed width, the expansion material may be caused to expand to urge the transducers toward the proper pitch for the present width of the data band of the tape. A predefined table of data band width to settings for controlling expansion of the expansion material may be used, the settings may be computed, etc.

In one embodiment, the apparatus 1100 may include a control element 1122 proximate to, embedded in, etc. each of the layers of expansion material 1116 for changing an expansion by the expansion material 1116. In some approaches, the control element 1122 may be positioned in the area 1130 between the magnetic transducers 1118a, 1118b. In some approaches, the control element may be a coil. In other approaches, the control element may be a resistive heating element in a geometric shape. In some approaches, the control element(s) 1122 may be built into the expansion material 1116 between the transducers (e.g. magnetic transducers 1118a, 1118b).

The layers of expansion material may be controlled via any suitable mechanism, including resistive (Joule) heating of the expansion material itself or of a heating element coupled thereto, inductive heating, by applying a voltage to a piezoresistive element, etc. For example, when the layers of expansion material are heated, the thermal expansion creates a force that creates a relative movement between the magnetic transducers along the substrate and/or closure.

In some approaches, the apparatus 1100 includes a controller (e.g. the controller may be graphically represented in FIG. 11 as the connection 1126) electrically coupled to each control element 1122 (e.g. via a wire 1124). As shown, the control elements 1122 are electrically coupled in series via wire 1124. In another approach, the control elements may be coupled in parallel to a common conductive bus. In a further approach, the control elements may be individually coupled to the controller in parallel via unique circuits thereby enabling the controller to control each element individually.

The controller may be configured to control a power level (e.g., current), or a voltage level, applied to the control elements 1122 for controlling an extent of expansion of the expansion material 1116 between each adjacent pair of magnetic transducers 1118a, 1118b in the array 1120 based on a current state of expansion of a magnetic recording tape moving over the array 1120 of magnetic transducers 1118a, 1118b.

In some approaches, when the drive detects that the tape has expanded beyond an acceptable limit, the controller may adjust the control signal applied to the control elements, thereby expanding the expansion material between the transducers, and thus increasing the distance between the transducers. Alternatively, when the drive detects that the tape has contracted, the controller may reduce the control signal applied to the control elements and thereby contracting the expansion material between the transducers, and thus decreasing the distance between the transducers.

In some approaches, the apparatus 1100 may include a substrate 1102, an undercoat layer 1106 above a substrate 1102, where the undercoat layer 1106 includes at least one layer of a first material 1108 (a single or a combination of materials) having a bulk modulus of elasticity lower than a bulk modulus of elasticity of the unpatterned films 1113. In addition, the apparatus 1100 includes the array 1120 of magnetic transducers 1118a, 1118b extending along the substrate 1102 above the undercoat layer 1106. Furthermore, the apparatus 1100 includes an overcoat layer 1110 above the array 1120 of magnetic transducers 1118a, 1118b and a closure 1104 above the overcoat layer 1110. The overcoat layer 1110 includes at least one layer of a second material 1112 having a bulk modulus of elasticity lower than a bulk modulus of elasticity of the unpatterned films 1113.

In some approaches, the first material 1108 may be the same as the second material 1112. In other approaches, the first material 1108 may be different than the second material 1112.

In some approaches, the apparatus includes a drive mechanism for passing a magnetic recording tape over the array of magnetic transducers and a controller electrically coupled to the array of magnetic transducers.

In one embodiment, the area of the expansion material may include regions of piezoelectric material, having a range of about 2 to 20 nanometers in a lateral direction within the area between the magnetic transducers. A voltage may be applied to each piezo in the element to cause a change in pitch between adjacent transducers of the magnetic head. In some approaches, the regions of piezoelectric material may be controlled in parallel. In other approaches, the regions of piezoelectric material may be controlled in series. Conventional electrical connections may be used to couple the piezoelectric material to the controller.

In some approaches, the area between the transducers may include a piezoelectric stack. Piezoelectric stacks are subassemblies of piezoelectric materials stacked in a configuration such that when energized by a voltage, expand or contract in the stack height direction. The stack configuration is desirable as the amount of motion per unit of voltage, or electrical charge, applied is amplified as a function of the number of layers used in the stack. Moreover, the mass of the piezoelectric stacks is relatively light, and shapes of the piezoelectric stacks are relatively simple, thus providing a simplified manner in which skew following, or improved track following while reading, can be achieved. Furthermore, the total voltage required to achieve a particular total expansion is reduced compared to having a single stack for the entire array of transducers.

In one embodiment, an apparatus includes a plurality of magnetic transducers arranged in a linear array and a layer of an expansion material between each adjacent pair of magnetic transducers in the array. In addition, each layer of expansion material may include a piezoelectric layer configured to adjust a pitch between the magnetic transducers adjacent thereto. In some approaches, the material may be a perovskite material. In other approaches, the material may be a titanate material.

Figure 12:
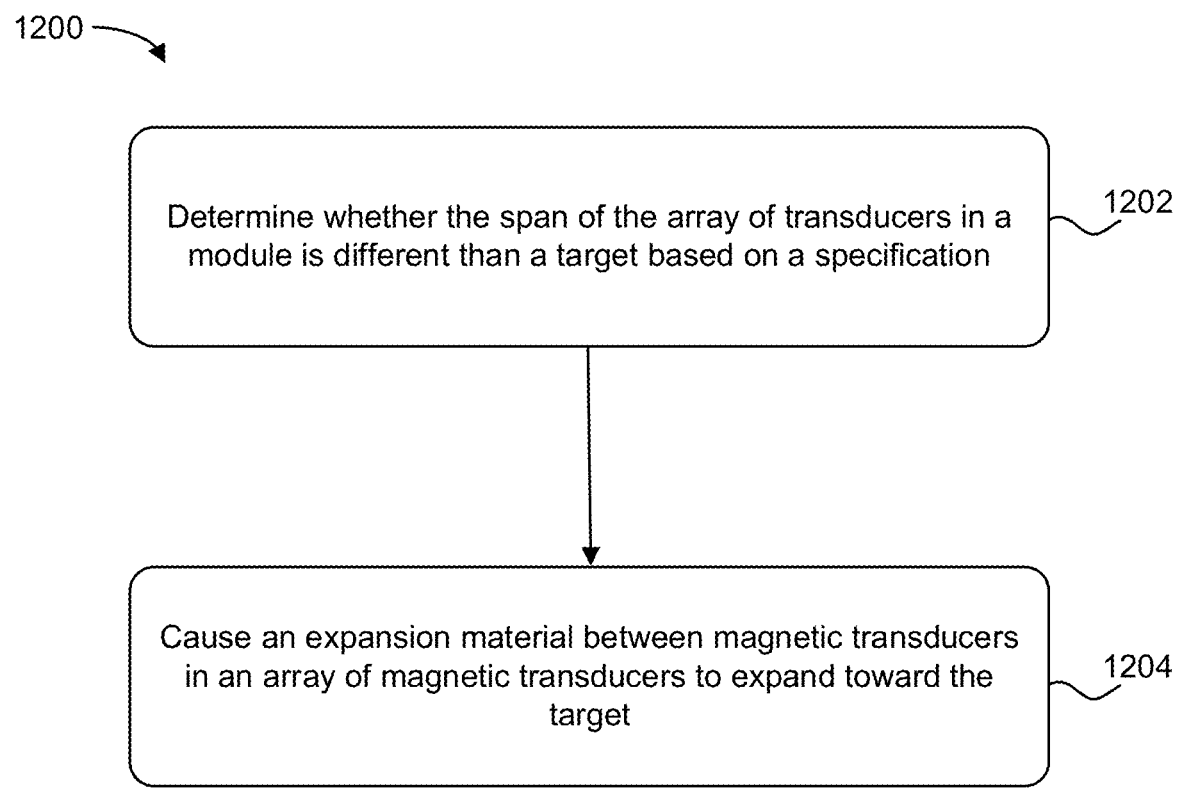
FIG. 12 is a flow chart of a method, according to one embodiment.

Now referring to FIG. 12, a flowchart of a computer-implemented method 1200 is shown according to one embodiment. The method 1200 may be performed in accordance with the present invention in any of the environments depicted in FIGS. 1-11B, among others, in various embodiments. Of course, more or less operations than those specifically described in FIG. 12 may be included in method 1200, as would be understood by one of skill in the art upon reading the present descriptions.

Each of the steps of the method 1200 may be performed by any suitable component of the operating environment. For example, in various embodiments, the method 1200 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1200. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 12, method 1200 includes determining whether the span of the array of transducers in a module is different than a target based on a specification, such as LTO. See operation 1202. The target based on the specification may include any type and measurement combination of measurements between any features of the module, such as a target transducer array length, a distance between outermost servo readers, an average design transducer pitch, etc. Moreover, the difference in span from the target may be determined using any process which would be apparent to one skilled in the art upon reading the present description. In some approaches, determining whether the span of the array of transducers is different than the target based on the specification includes reading at least two servo tracks of a magnetic recording tape and deriving a length of the span therefrom, and comparing the length to a target length based on a specification. In some approaches, the target may be based on a current state of expansion of the magnetic recording tape as would be reflected in the actual distance between adjacent servo tracks. For example, reading servo tracks of a moving magnetic recording tape indicate that the length of the span of the array of transducers of the module is less than the target of the specification of the magnetic recording tape in use, thereby indicating a possible misplacement of tracks on the magnetic recording tape.

Method 1200 proceeds to operation 1204 where an expansion material between magnetic transducers in an array of magnetic transducers is caused to expand toward the target, e.g., by heating, piezoelectric effect, memory alloy, etc. In some approaches, the heating of the expansion material is based on the extent of lateral expansion of the moving magnetic tape. In some approaches, heating of the expansion material includes applying voltage to a heating element, where the heating element is positioned in the expansion material.

In some approaches, method 1200 may include adjusting tension of a moving magnetic recording tape over the array of transducers for altering a width of the tape. Tape tension compensation may dynamically adjust a span of transducers on the module to minimize misregistration with a specific tape. For example, tapes may undergo dimensional changes during changes in temperature and/or humidity, tape creep after writing, etc. The width of the outermost tape windings (e.g. may be as much as one-third of the tape) may undergo a contraction due to tape tension in the outer windings, where compression due to tape pack pressure is small. Moreover, in a same tape cartridge, the innermost tape windings may undergo an expansion from tape pack pressure.

The tape tends to absorb heat from the module, and therefore may itself expand due to the heating. Therefore, one embodiment, the state of the tape is monitored via the track following system and the amount of heating is adjusted accordingly to maintain the proper transducer array length. In addition, and/or alternatively, the tape speed may be adjusted to control the amount of heat absorbed by the tape, thereby providing a level of control over the degree of registration between module and tape.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
a substrate;
a closure above the substrate;
a gap between the closure and the substrate, the gap having an array of magnetic transducers extending therealong; and
wherein the gap further includes a first layer of aluminum, wherein a thickness of the first layer is in a range of about 0.5 microns to about 2.0 microns.

2. An apparatus as recited in claim 1, wherein the first layer is positioned between the array of magnetic transducers and the substrate.

3. An apparatus as recited in claim 2, wherein the first layer is configured to reduce a mechanical coupling between the array of magnetic transducers and the substrate.

4. An apparatus as recited in claim 1, wherein the first layer is positioned between the array of magnetic transducers and the closure.

5. An apparatus as recited in claim 4, wherein the gap comprises a second layer positioned between the array of magnetic transducers and the substrate, the second layer being primarily aluminum.

6. An apparatus as recited in claim 5, wherein the second layer is aluminum.

7. An apparatus as recited in claim 5, wherein the second layer is a continuous layer extending along and beyond opposite ends of the array of magnetic transducers.

8. An apparatus as recited in claim 5, wherein the second layer also includes a photoresist material.

9. An apparatus as recited in claim 1, wherein the gap has unpatterned films, wherein the first layer has a bulk modulus of elasticity less than a bulk modulus of elasticity of the unpatterned films in the gap.

10. An apparatus as recited in claim 9, wherein the unpatterned films include a layer selected from the group consisting of: a planarization layer and an encapsulation layer.

11. An apparatus as recited in claim 1, wherein the first layer is a continuous layer extending along and beyond opposite ends of the array of magnetic transducers.

12. An apparatus as recited in claim 1, further comprising:
- a drive mechanism for passing a magnetic medium over the array of magnetic transducers; and
- a controller electrically coupled to the array of magnetic transducers.

13. An apparatus comprising,
- a substrate;
- a closure above the substrate;
- a gap between the closure and the substrate, the gap having an array of magnetic transducers extending therealong; and
- wherein the gap further includes a first layer of aluminum,
- wherein the first layer is positioned between the array of magnetic transducers and the closure,
- wherein the gap comprises a second layer positioned between the array of magnetic transducers and the substrate, the second layer being primarily aluminum,
- wherein the first layer is different from the second layer.

14. An apparatus, comprising:
- a substrate;
- a closure above the substrate;
- a gap between the closure and the substrate, the gap having an array of magnetic transducers extending therealong; and
- wherein the gap further includes a first layer of a first material, wherein the first material is primarily aluminum,
- wherein a thickness of the first layer is in a range of about 0.5 microns to about 2.0 microns, wherein the first layer is a continuous layer extending along and beyond opposite ends of the array of magnetic transducers.

15. An apparatus as recited in claim 14, wherein the first layer also includes a photoresist material.

16. An apparatus as recited in claim 14, wherein the first layer includes primarily aluminum.

17. An apparatus as recited in claim 14, wherein the first layer is positioned between the array of magnetic transducers and the closure, wherein the gap comprises unpatterned films and a second layer positioned between the transducers and the substrate, the second layer having a bulk modulus of elasticity lower than the unpatterned films in the gap.

18. An apparatus as recited in claim 17, wherein the unpatterned films include a layer selected from the group consisting of: a planarization layer and an encapsulation layer.

* * * * *